United States Patent
Oinas et al.

[11] Patent Number: 6,010,630
[45] Date of Patent: *Jan. 4, 2000

[54] METHOD FOR RECOVERING AT LEAST ONE METAL FROM AN ACIDIFIED WASTE WATER SLUDGE

[75] Inventors: Pekka Oinas, Kokkola; Simo Jokinen, Oulu, both of Finland

[73] Assignee: Kemira Kemi AB, Helsingborg, Sweden

[ * ] Notice: This patent is subject to a terminal disclaimer.

[21] Appl. No.: 08/601,052

[22] PCT Filed: Aug. 26, 1994

[86] PCT No.: PCT/FI94/00377

§ 371 Date: Jun. 10, 1996

§ 102(e) Date: Jun. 10, 1996

[87] PCT Pub. No.: WO95/06005

PCT Pub. Date: Mar. 2, 1995

[30] Foreign Application Priority Data

Aug. 26, 1993 [FI] Finland ..................................... 933751

[51] Int. Cl.$^7$ ..................................... B01D 11/02
[52] U.S. Cl. .................... 210/638; 210/634; 210/639; 210/722; 210/767; 423/139
[58] Field of Search ..................... 210/634, 639, 210/757, 758, 759, 638, 713, 651, 711, 722, 712, 906, 806, 912, 767; 423/139

[56] References Cited

U.S. PATENT DOCUMENTS

| | | | |
|---|---|---|---|
| 3,649,220 | 3/1972 | Dowell et al. | 210/638 |
| 4,255,372 | 3/1981 | Chiang | 423/139 |
| 4,261,959 | 4/1981 | Kim et al. | 423/139 |
| 4,311,676 | 1/1982 | Demarthe et al. | 423/139 |
| 4,343,706 | 8/1982 | Etzel et al. | 210/711 |
| 4,348,228 | 9/1982 | Zarur | 423/139 |
| 4,443,342 | 4/1984 | Stas et al. | 210/763 |
| 4,539,119 | 9/1985 | Cann | 210/711 |
| 5,028,334 | 7/1991 | Rickelton et al. | 210/638 |
| 5,051,186 | 9/1991 | Prior | 210/638 |
| 5,051,187 | 9/1991 | Matsumoto et al. | 210/639 |
| 5,102,556 | 4/1992 | Wong | 210/711 |
| 5,188,735 | 2/1993 | Delloye et al. | 210/634 |
| 5,229,003 | 7/1993 | Duyvesteyn | 210/638 |
| 5,296,151 | 3/1994 | Müller et al. | 210/722 |
| 5,433,855 | 7/1995 | Campbell et al. | 210/638 |
| 5,538,636 | 7/1996 | Gnann et al. | 210/748 |
| 5,720,882 | 2/1998 | Stendahl et al. | 210/638 |

FOREIGN PATENT DOCUMENTS

| | | |
|---|---|---|
| 142903 | 2/1981 | Denmark . |
| 0 058 148 A3 | 8/1982 | European Pat. Off. . |
| 0 332 447 A1 | 9/1989 | European Pat. Off. . |
| 3633864 A1 | 4/1988 | Germany . |

*Primary Examiner*—Ana Fortuna
*Attorney, Agent, or Firm*—Seed and Berry LLP

[57] ABSTRACT

A method for recovering at least one metal from an acidified waste water sludge by liquid-liquid extraction by providing an acidified waste water sludge containing ions of at least one metal and organic material, treating the waste water with an oxidizer to convert the organic material into a form that does not have an unfavorable effect on a subsequent liquid-liquid extraction, and subjecting the treated, acidified waste water sludge to a liquid-liquid extraction thereby obtaining an organic phase loaded with ions of said at least one metal, and subsequently recovering ions of said at least one metal from said organic phase.

17 Claims, 2 Drawing Sheets

METHOD FOR RECOVERING AT LEAST ONE METAL FROM AN ACIDIFIED WASTE WATER SLUDGE

TECHNICAL FIELD

This invention relates to a method for recovering at least one metal, especially iron and possibly also aluminium from an acidified waste water sludge. In particular, the sludge is from a waste water purification process where waste water is precipitated using chemicals containing iron and aluminium.

BACKGROUND OF THE INVENTION

Disposal of waste water sludge is a major problem in water purification plants. This is partly due to the heavy metal content of the sludge. It is difficult to find suitable places for the waste and as standards rise landfilling is becoming more and more expensive. From this perspective the idea of recycling the waste water sludge is becoming increasingly important. A complete recycling of waste water sludge would involve recycling of coagulants (iron and aluminium), part of the organic substances of the sludge, recovery of phosphorus, and separation of the heavy metals from the sludge. Until now recycling of the sludge has been realized only partially. There are no existing production methods for separating coagulant chemicals and phosphorus from the sludge.

Sludge comes from various sources of the waste water purification process i.e. from pre-precipitation, simultaneous precipitation and post-precipitation stages. One possible treatment procedure for the sludge is first to dewater it to a dry solids content of 15–25% and then to use in agriculture, compost, incinerate or transport the dewatered sludge to a dump.

Another possible procedure is to acidify the precipitation sludge to dissolve metals. Insoluble substances are removed by filtering. The dissolved metals and phosphorus in the filtrate are precipitated and a sludge, which will be called a metal sludge, is obtained. The metal sludge contains the iron and aluminium of the used coagulant and, in addition, phosphorus and heavy metals. The procedure can also be performed at an elevated temperature to improve yield and filterability i.e. the dewatering properties of the sludge. The sludge to be treated can be a pre-precipitation sludge, a simultaneous precipitation sludge, post-precipitation sludge or a mixture thereof.

One additional alternative for treating the sludge is hydrolysis where the purpose is to hydrolyse organic material of the sludge into short-chained compounds to be utilized in later stages of the waste water treatment process, especially as carbon source in the denitrification stage. During hydrolysis, the metals of the raw sludge dissolve in the hydrolysate solution. In the so-called thermal acid hydrolysis the temperature is 150–160°C. and pH<2 preferably 1–1.5. After the hydrolysis, the insoluble part i.e. the organic sludge is separated, the sludge containing mainly insoluble organic and partly inorganic material e.g. fibres and silicate minerals. The pH of the obtained solution is raised above the neutral level using a base so that the dissolved metals precipitate as hydroxides and phosphates. The precipitated sludge i.e. the metal sludge is then separated. The metal sludge contains iron and aluminium and also phosphorus and heavy metals.

Acidification nor hydrolysis of sludge is not commonly used in waste water purification. One reason is poor profitability. An additional problem is the metal sludge which has no use. The metal sludge contains heavy metals which makes the sludge a harmful waste for the environment.

The metal sludge can be dissolved in sulphuric acid or possibly in hydrochloric acid and the insoluble substances can be filtered. The acidic filtrate solution contains the coagulants, phosphorus and heavy metals. It cannot be recycled or utilized in any other way as such and there are no existing methods to separate the elements.

Solvent extraction i.e. liquid-liquid extraction is a well-known method for separating different elements from each other and, in principle, it could be used to separate said elements. However, there are difficulties in applying extraction to the acidified metal sludge of the above kind or to any other acidified waste water sludge. The acidic solution obtained by leaching waste water sludge with sulphuric acid not only contains dissolved metals but also insoluble fine solid particles, colloidal components, humic acids etc. These impurities comprise an undesirable organic residue (crud) which has the most unfavourable effect on extraction. It significantly retards mass transfer and phases disengagement. In disengagement of phases, after contacting the organic and aqueous phases, this substance usually collects as a separate layer between the phases. Therefore, the existence of the insoluble residue has prevented extraction methods from being exploited in the recovery of iron and aluminium from acidified sewage sludge.

Solvent extraction of metals from strongly acidic solutions is known from treatment of spent pickling bath solutions. The patent publication U.S. Pat. No. 5,051,186 presents such a method for separating iron and zinc utilizing solvent extraction with diethyl hexyl phosphate (DEHPA) as the extracting agent. Aluminium recovery by using solvent extraction with a mixture of monoethyl hexyl phosphate (MDEHPA) and DEHPA has been suggested by Cornwell and Zoltek in J. Water Pollut. Control Fed., Vol 49, p. 600–612. A process employing solvent extraction with organic extractants for the removal of iron from aqueous acidic solutions has been suggested in the patent publication EP 58148 where the objective was to recover pure acid by extracting iron ions into organic solvent. Solvent extraction used for the selective recovery of dissolved iron and aluminium can, with a proper solvent, efficiently separate iron and aluminium from heavy metals.

SUMMARY OF THE INVENTION

The objective of the invention is to provide a method which can be used in the recovery of at least one metal, especially iron or iron and aluminium from acidified waste water sludge.

This objective can be accomplished by the present invention, and thus the present invention provides a method for recovering at least one metal from an acidified waste water sludge by liquid-liquid extraction, said method comprising:

providing an acidified waste water sludge comprising ions of at least one metal and organic material, treating said acidified waste water sludge with an oxidizer to convert the organic material into a form that does not have an unfavourable effect on a subsequent liquid-liquid extraction, and subjecting said treated, acidified waste water sludge to a liquid-liquid extraction thereby obtaining an organic phase loaded with ions of said at least one metal, and subsequently recovering ions of said at least one metal from said organic phase.

DETAILED DESCRIPTION OF THE INVENTION

According to the method of this invention the acidic feed solution is first treated with oxidizer in order to eliminate the detrimental organic residue. The oxidizing agent is preferably a strong hydrogen peroxide solution. Other possible oxidizers are oxygen, ozone, potassium permanganate, potassium dichromate, chlorine, and chlorine dioxide. After or alternatively before this treatment the solution can be filtered and the filtrate solution is subjected to liquid-liquid extraction.

According to a preferred embodiment said liquid-liquid extraction comprises an extraction stage and a stripping stage, wherein said acidified waste water sludge in the extraction stage is contacted with a water immiscible extraction solution thereby forming an aqueous phase and said organic phase loaded with ions of said at least one metal, the aqueous phase is separeted from the organic phase, the organic phase in the stripping stage is contacted with an acidic aqueous stripping solution thereby forming an aqueous phase loaded with ions of said at least one metal and an organic phase, and the aqueous phase loaded with the desired metal ions is separated from the organic phase.

The extraction solution contains an organic phosphate, an organic solvent and possibly a long-chain alcohol. The organic phosphate is advantageously an alkyl phosphate like a monoalkyl phosphate e.g. mono-(2-ethyl hexyl) phosphate (MEHPA), a dialkyl phosphate e.g di-(2-ethyl hexyl) phosphate (DEHPA) or a trialkyl phosphate e.g. tributyl phosphate, or a mixture thereof e.g. a mixture of MEHPA and DEHPA (MDEHPA). The extraction solution may contain other organic reagents. One such reagent, which has been found very effective together with DEHPA, is a derivative of hydroxyquinoline e.g. 8-hydroxyquinoline. The organic solvent is advantageously a long-chained hydrocarbon solvent like kerosene. The long-chained alcohol can be a 2-octanol, for example.

Besides oxidizing organic substances, hydrogen peroxide has another important role in the process. Hydrogen peroxide also oxidates Fe(II) to Fe(III) which increases the efficiency of iron extraction since ferrous iron is extracted to a lesser degree to alkyl phosphates at low pH (pH<1.5). As to organics removal, hydrogen peroxide treatment is preferred to activated charcoal adsorption. This is due to the heterogeneity of the feed sludge material which may cause unexpected phenomena causing blockage of the solid activated carbon bed.

After extraction and phases separation the metal ions attached into the solvent are stripped i.e. re-extracted with an inorganic acid, such as hydrochloric or sulphuric acid. Stripping can be conducted under reductive conditions. Sulphurous acid obtained by bubbling sulphur dioxide into sulphuric acid or water is an effective stripping agent. Water soluble sulphites or tiosulphates are also possible e.g. as compounds of alkali metals.

In extraction with organic phosphates the acidity of the aqueous phase increases as protons are released from the extractant. Since the extraction capacity is decreased with decreasing pH, it is preferable to perform the extraction at constant pH if possible. This can be achieved by adding neutralizing agents, such as caustic soda or ammonia during extraction. The pH of the aqueous phase must, however, be below 1.5 since at higher pH the dissolved metals begin to precipitate. For example, iron precipitates in the form of ferric phosphate or hydroxide.

The acidified waste water sludge to be treated with the method of the present invention is e.g. acidified metal sludge, said metal sludge being obtained by subjecting waste water sludge from a waste water treatment plant to acid treatment followed by precipitation of metal sludge from the filtrate.

DESCRIPTION OF THE DRAWINGS

The invention is described in more details in the following referring to the enclosed drawings in which

FIG. 1 shows diagrammatically processing of a sludge from a water treatment plant. The metals in the sludge dissolve in the solution during acidification. The insoluble part i.e. the organic sludge is separated, the organic sludge containing primarily insoluble organic material like fibres and possibly insoluble inorganic material like silicate minerals. For neutralizing the solution and precipitation of metals a base e.g. lime is added to the solution. In the subsequent separation stage the metal sludge is separated. The filtrate is led to later stages of the waste water treatment process.

As already mentioned, the metal sludge is dissolved in sulphuric acid or possibly in hydrochloric acid and insoluble substances are separated by filtering. As an example, the filtrate solution contains iron (max. 6%) both ferric and ferrous, aluminium (max. 1%), Ca (max. 1000 ppm), Mg (max. 100 ppm), Pb (max. 100 ppm), Cu, Ti, Cd, etc.

Figure 1:
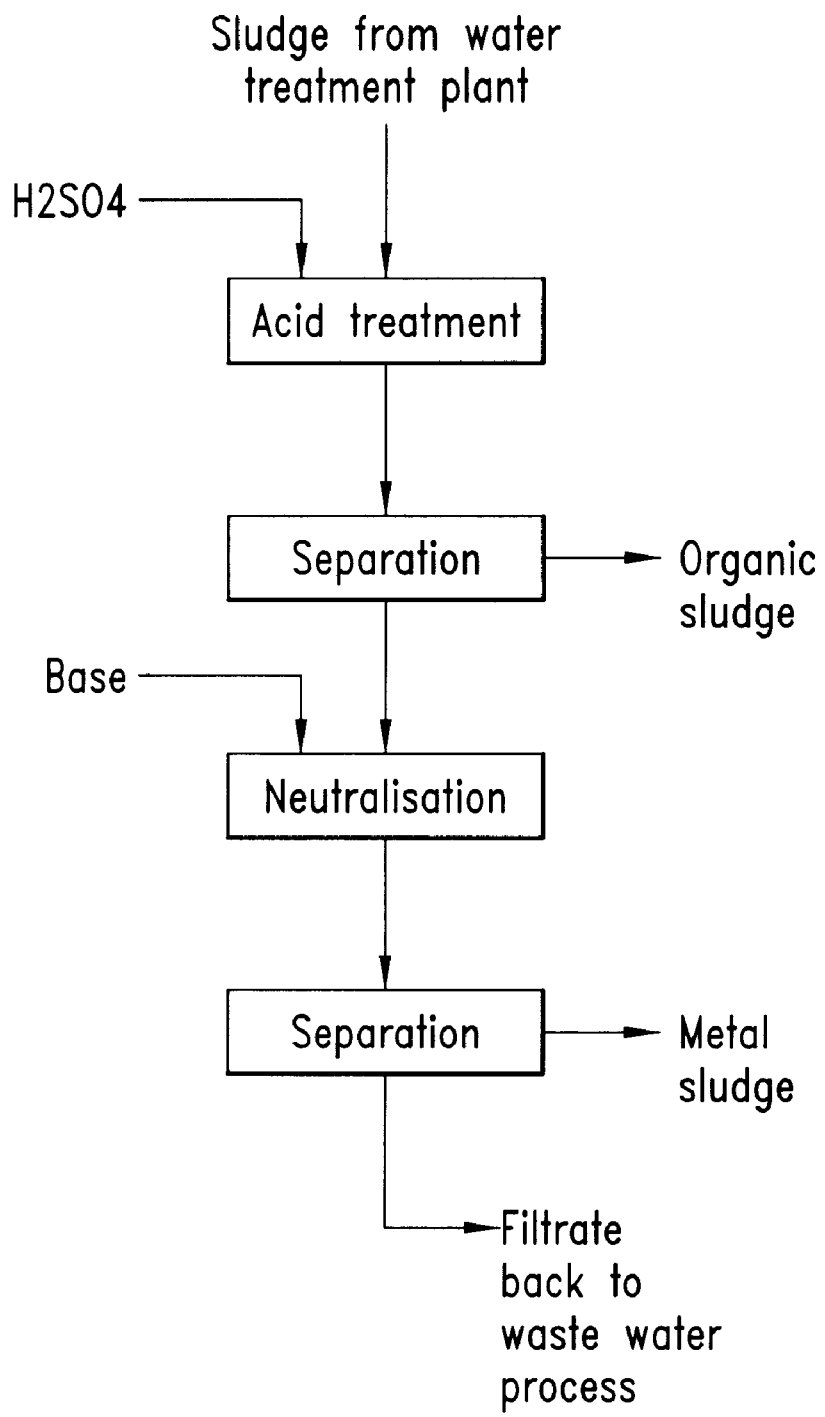
FIG. 1 shows the acidification process of a sludge as a block diagram and FIG. 2 shows schematically a process according to the invention.
Figure 2:
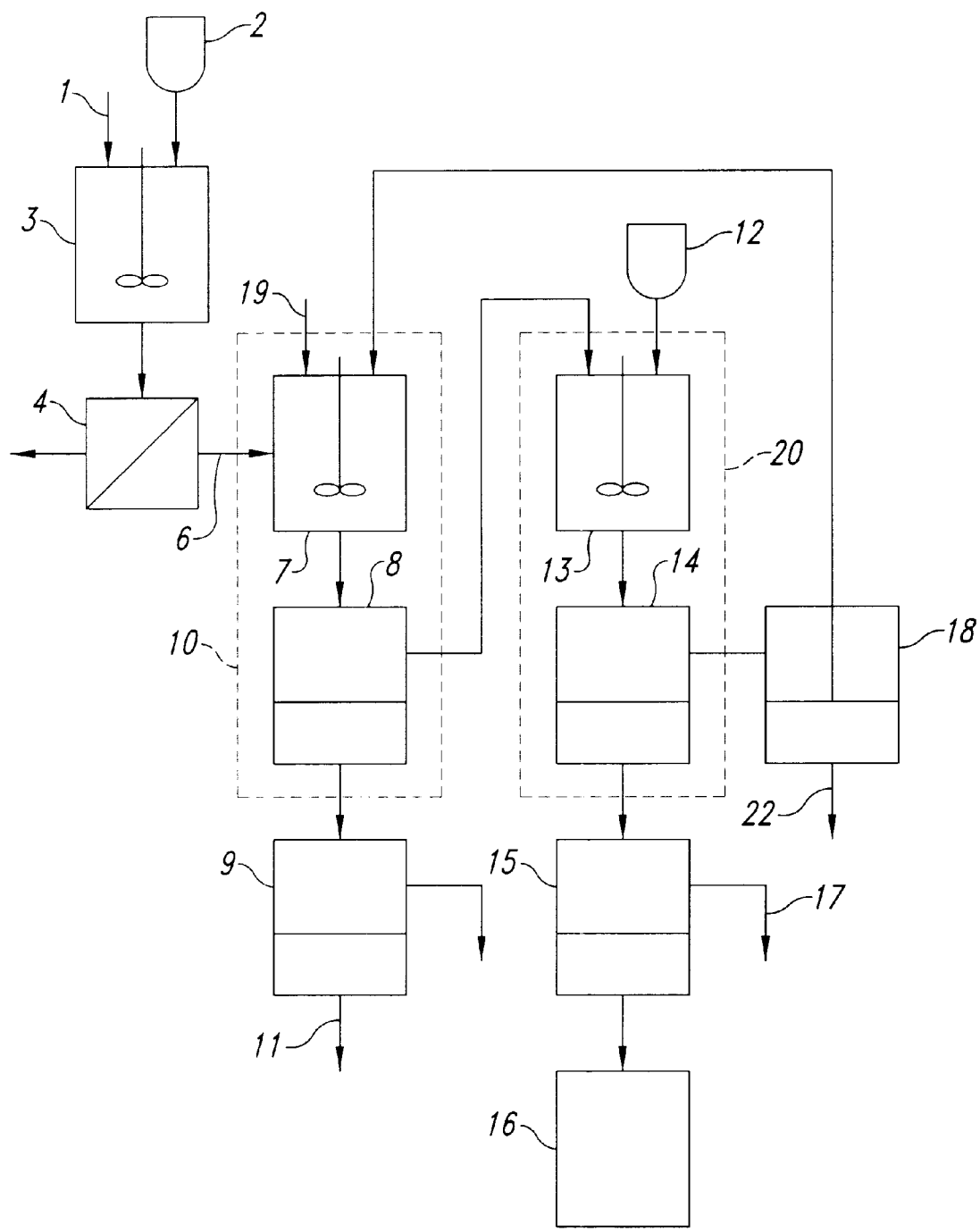

As shown in FIG. 2, the solution is conducted through a feed line 1 to a stirred cell 3 where the sludge is contacted with strong hydrogen peroxide from the hydrogen peroxide reservoir tank 2. The concentration of $H_2O_2$ in the hydrogen peroxide reservoir tank 2 is preferably 30% or higher. Hydrogen peroxide reacts with humic acids causing a temperature rise, the rate and magnitude of which depends on the rate of addition. The solution is then filtered through a porous media like fuller's earth, for example, to remove fine suspended solids in a filter 4. The solids from the filter 4 are discharged.

The filtrate from filter 4 is conducted through line 6 to extracting stage 10, to the first mixer 7 of a multi-stage mixer-settler train thereof. In the mixer 7 the filtrate is contacted with a solvent mixture containing an alkyl phosphate component such as DEHPA, MEHPA or a mixture thereof (MDEHPA), long chain hydrocarbon diluent such as kerosene, and long chain alcohol modifier such as 2-octanol. The ratio of organic phase to aqueous phase and the minimum volume fraction of the alkyl phosphate depend on the concentration of iron and aluminium to be extracted. Alcohol component is needed to facilitate phase disengagement in settlers 8. To prevent rise of acidity and to increase extraction efficiency, caustic soda or ammonia can be added in the mixers.

The aqueous phase is transferred to the first settler 9 of a multi-stage settler train to remove the spent organic solution which is decanted and discharged. The residual acid containing the metal ions other than iron and aluminium is led through line 11 for further treatment. Ferrous iron is not transferred completely into the organic solvent.

The organic phase laden with iron and aluminium is conducted from the settler 8 to stripping stage 20. The stripping or re-extraction of iron and aluminium is performed in a multi-stage mixer-settler train 13, 14 where the extract is contacted with an inorganic acid fed from an acid reservoir tank 12. The acid may be strong hydrochloric acid, the concentration of which is preferably 6N. Hydrochloric acid is more effective than sulphuric acid as such, but stripping can be facilitated by creating reductive conditions where ferric iron is transformed to ferrous iron. These reductive conditions can be achieved, for example, by bubbling sulphur dioxide into sulphuric acid. The reductive conditions can be further enhanced by using iron powder in addition to sulphur dioxide. The aqueous phase from settler 14 is purified from spent solvent in a series of settlers 15. The product acid containing iron and aluminium is stored in tank 16. The residual solvent is decanted and discharged through line 17.

The organic solvent from settler 14 is purified from spent acid in a multi-stage settler train 18 and recirculated back to the extraction stage 10, where also make-up solvent is added through line 19. The acid residue from settler 18 is discharged through line 22.

EXAMPLES

A set of selected experimental examples are presented in the following:

EXAMPLE 1

A solution was obtained by leaching a metal containing waste water sludge with dilute $H_2SO_4$ and filtering for removing insoluble material. The pH of the obtained solution was about 1 and its density 1080 kg/m³. The solution contained 0.6% $Fe^{2+}$, 1.8% $Fe^{3+}$, and 0.21% Al. A 10 ml volume of $H_2O_2$ was added to 120 ml of the above solution during 60 minutes in a stirred cell. During feeding $H_2O_2$ the temperature increased from 20° C. to 55° C. The solution was filtered once more through a fuller's earth filter. The thickness of the filter bed was 10 mm. A 60 ml volume of the filtrate solution was contacted with 180 ml of an organic extraction solvent so that the phase ratio organic/aqueous= 3/1. The organic solvent consisted of 22.5% MDEHPA, 67.5% kerosene and 10% 2-octanol. MDEHPA contained 45% MEHPA and 55% DEHPA. After 20 minutes of mixing the mixture was withdrawn to a separation funnel for phase separation. The organic phase was disengaged from the aqueous phase very rapidly, in about 10–15 seconds. Virtually no crud was detected between the phases. The efficiency of the extraction is presented in Table 1a.

TABLE 1a

The efficiency of extraction

| Component | Efficiency |
|---|---|
| Total Fe | 96.4% |
| Al | 21.3% |

25 ml of the organic extract loaded with Fe and Al was contacted with 6M HCl in a stirred cell for 20 minutes. Thereafter the phases were separated in a separation funnel. The disengagement was again rapid. The efficiency of stripping is presented in Table 1b.

TABLE 1b

The efficiency of stripping

| Component | Efficiency |
|---|---|
| Total Fe | 52.9% |
| Al | 70.8% |

EXAMPLE 2 (Comparative example)

The procedure of Example 1 was repeated but no $H_2O_2$ was added. The feed solution contained 1.14% $Fe^{2+}$, 0.66% $Fe^{3+}$ and 0.18% Al. The settling time after extraction was approximately 5 minutes. A considerable amount of crud was observed between the layers of organic and aqueous phase. The efficiency of the extraction is presented in Table 2.

TABLE 2

The efficiency of extraction

| Component | Efficiency |
|---|---|
| Total Fe | 82.7% |
| Al | 85.6% |

EXAMPLE 3

The procedure of Example 1 was repeated but 4 ml of $H_2O_2$ was added during 20 minutes and temperature and pH were kept constant, the temperature at 22–23° C. and the pH at 0.9 by adding 25% $NH_4OH$ during extraction. The feed solution contained 1.17% $Fe^{2+}$, 0.536 $Fe^{3+}$ and 0.17% Al. The settling time after extraction was about 30 seconds. A small amount of crud was observed. The efficiency of the extraction is presented in Table 3.

TABLE 3

The efficiency of extraction

| Component | Efficiency |
|---|---|
| Total Fe | 99.1% |
| Al | 99.0% |

EXAMPLE 4

The procedure of Example 1 was repeated but the 150 ml of the extract was stripped with 150 ml of 1M $H_2SO_4$ in reducing conditions with simultaneously bubbling $SO_2$ into the mixture in an autoclave under stirring at constant temperature, 25° C. and atmospheric pressure for 60 minutes. The efficiency of stripping is presented in Table 4.

TABLE 4

The efficiency of stripping

| Component | Efficiency |
|---|---|
| Total Fe | 35.3% |
| Al | 59.1% |

EXAMPLE 5

A metal sludge was acidified with a dilute sulphuric acid and the insoluble material was separated by filtration. The filtrate had a pH of 1 and density of 1080 kg/m³. The solution contained 2.0% Fe, 0.17% Al, and 0.28% TOC (total organic content). A 5 ml volume of $H_2O_2$ (10%) was added to 120 ml of the solution. The obtained solution was filtrated with fuller's earth. The depth of the filtration bed was 10 mm. The filtrated solution contained 1.48% $Fe^{3+}$, 0.3% $Fe^{2+}$, 0.15% Al and 0.2% TOC. A 150 ml amount of organic solution containing 27.5% DEHPA, 67.5% Shelsoll K ($C_{11}$-paraffin) and 5% 2-octanol was added to 50 ml of the filtrated solution. The mixture was mixed for 60 minutes at 50° C. The pH of the solution was kept at a constant value of 1 using 1M NaOH. After extraction the mixture was transferred into a separating funnel where disengagement of phases took place in about 10 minutes. The raffinate contained 0.03% $Fe^{3+}$, 0.15% $Fe^{2+}$, 0.1% Al, and 0.14% TOC. The extraction yields are given in Table 5. As already mentioned, the TOC content of the pre-treated solution was 0.20% which indicates that total carbon content decreases in the pre-treatment with hydrogen peroxide. The yield of TOC was 16% i.e. this portion of TOC of the feed solution was transferred into the organic phase. The yield of total Fe was high (88%).

A 25 ml amount of the organic phase containing Fe and Al was mixed with 6M HCl for 60 minutes. The phases disengaged rapidly. The stripping yield of iron was about 50%.

EXAMPLE 6 (Comparative example)

The procedure was similar to that of example 5 except that no hydrogen peroxide was added. In this example filtration was performed twice with fuller's earth. The filtrated solution contained 0.57% $Fe^{3+}$, 1.24% $Fe^{2+}$, 0.15% Al, and 0.25% TOC. Filtration had virtually no effect on TOC. Compared to example 5, there was not much difference in the phases disengagement but there was a great difference in yields as can be seen in Table 5. The raffinate contained 0.02% $Fe^{3+}$, 1.1% $Fe^{2+}$, 0.09% Al, and 0.26% TOC. Stripping proceeded in the same way as in Example 5. The yield of TOC was very small. The yield of total Fe was much lower (42%) than in Example 5.

EXAMPLE 7 (Comparative example)

The procedure was similar to that of example 5 except that no hydrogen peroxide was added. The pre-treatment comprised treating the solution with active carbon and a subsequent filtration with fuller's earth. The amount of active carbon was 15 g/100 ml solution. The active carbon granules which were used in the treatment had been sieved with 1 mm sieve to remove smaller granules. The mixture of the active carbon and the solution was slowly stirred for 20 minutes without breaking the active carbon. After stirring the mixture was filtrated through a fuller's earth bed. The filtrated solution contained 0.54% $Fe^{3+}$, 1.25% $Fe^{2+}$, 0.16% Al, and 0.13% TOC. Extraction was performed as in example 5. The raffinate contained 0.02% $Fe^{3+}$, 1.17% $Fe^{2+}$, 0.08% Al, and 0.15% TOC. The extraction yields are given in Table 5. As seen in Table 5, no organic matter was transferred into the organic phase in this example. The yield of total Fe was much lower (38%) than in Example 5.

EXAMPLE 8 (Comparative example)

The procedure was similar to that of Example 5 except that no hydrogen peroxide was added. The pre-treatment comprised treating the solution with aluminium oxide (ALCOA) and a subsequent filtration with fuller's earth. The amount of aluminium oxide was 15 g/100 ml solution. The aluminium oxide granules which were used in the treatment had been sieved with 1 mm sieve to remove smaller granules. The mixture of alumina and the solution was slowly stirred for 20 minutes without breaking the aluminium oxide granules. After stirring the mixture was filtrated through a fuller's earth bed. The filtrated solution contained 0.45% $Fe^{3+}$, 1.20% $Fe^{2+}$, 0.26% Al, and 0.26% TOC. No TOC had been removed in the pre-treatment. Extraction was performed as in example 5. The raffinate contained 0.02% $Fe^{3+}$, 1.02% $Fe^{2+}$, 0.14% Al, and 0.26% TOC. The extraction yields are given in Table 5. As seen in Table 5, no organic matter was transferred into the organic phase in this example. The yield of total Fe was very low (41%).

EXAMPLE 9

The procedure was similar to that of example 5 except that treatment with hydrogen peroxide was done after filtration with fuller's earth. The pre-treated solution contained 1.65% $Fe^{3+}$, 0.12% $Fe^{2+}$, 0.15% Al, and 0.19% TOC. The TOC content indicates that there was a similar decrease in TOC as in Example 5. Extraction was performed as in Example 5. The raffinate contained 0.04% $Fe^{3+}$, 0.07% $Fe^{2+}$, 0.13% Al, and 0.17% TOC. The yield of TOC from the pre-treated solution to the organic phase was 7%. This result suggests that, as in Example 5, part of the organic matter was in such a form that it was transferred from the pre-treated solution into the organic phase. The yield of total Fe was even higher than in Example 5.

TABLE 5

Extraction yields in Examples 5–9.

| | | Extraction yield (%) | | | | |
|---|---|---|---|---|---|---|
| Ex | Pre-treatment method | Fe | $Fe^{3+}$ | $Fe^{2+}$ | Al | TOC |
| 5 | $H_2O_2$ + f.e.[1) | 88 | 98 | 40 | 20 | 16 |
| 6 | f.e. twice | 42 | 97 | 16 | 43 | 2 |
| 7 | active carbon + f.e. | 38 | 96 | 12 | 53 | 0 |
| 8 | aluminium oxide + f.e. | 41 | 97 | 15 | 46 | 0 |
| 9 | f.e. + $H_2O_2$ | 94 | 97 | 40 | 10 | 7 |

[1)f.e. = fuller's earth filtration

To summarize the results, Examples 5–9 show clearly that hydrogen peroxide increases the efficiency of extraction. Part of this effect can be explained by the fact that hydrogen peroxide transforms the divalent iron ($Fe^{2+}$) into the more extractable form i.e. the trivalent form ($Fe^{3+}$). There is an additional effect which transforms the organic matter into a form which facilitates extraction. Use of hydrogen peroxide also increases yield of $Fe^{2+}$. When MEHPA or DEHPA is used as the main extractant, the amount of crud increases substantially if hydrogen peroxide is not used (Example 2). These conclusions are valid for iron extraction, in particular. The results of Al are not so clear and this is partly due to the relative small amount of Al in the original solution.

We claim:

1. A method for recovering at least one metal from a waste water sludge containing organic material, said at least one metal comprising iron and optionally aluminum originating from a waste water coagulant, the method comprising:
   acidifying said sludge with sulfuric acid to provide an acidified waste water sludge comprising ions of iron and optionally aluminum, and organic material,
   treating said acidified waste water sludge with an oxidizer to convert the organic material into a form that does not have an unfavorable effect on a subsequent liquid-liquid extraction and to oxidize bivalent iron contained in said acidified waste water sludge to trivalent iron, and
   subjecting said treated acidified waste water sludge to a liquid-liquid extraction thereby obtaining an organic phase loaded with ions of iron and optionally aluminum, and subsequently recovering ions of iron and optionally aluminum from said organic phase.

2. A method of claim 1, wherein said oxidizer comprises a strong hydrogen peroxide solution.

3. A method of claim 1, further comprising subjecting the acidified waste water sludge to filtration after the treatment with said oxidizer.

4. A method of claim 1, further comprising subjecting the acidified waste water sludge to filtration prior to the treatment with said oxidizer.

5. A method of claim 1, wherein said liquid-liquid extraction comprises an extraction stripping stage, wherein said acidified waste water sludge in the extraction stage is contacted with a water immiscible extraction solution thereby forming an aqueous phase and said organic phase load with ions of iron and optionally aluminum, the aqueous phase is separated from the organic phase, the organic phase in the stripping stage is contacted with an acidific aqueous stripping solution thereby forming an aqueous phase loaaded withions of iron and optionally aluminum, and an organic phase, and the aqueous phase loaded with the desired metal ion is separated from the organic phase.

6. A method of claim 5, wherein said stripping solution comprises hydrochloric acid or sulphuric acid.

7. A method of claim 5, wherein the stripping is conducted under reducing conditions obtainable by using a stripping solution comprising sulphurous acid obtained by bubbling sulphur dioxide into water or diluted sulphuric acid.

8. A method of claim 5, wherein said extraction solution comprises an organic phosphate and an organic solvent.

9. A method of claim 8, wherein said organic phosphate is an alkyl phosphate.

10. A method of claim 9 wherein said alkyl phosphate is selected from the group consisting of monoalkyl phosphates, dialkyl phosphates, trialkyl phosphates, and mixtures thereof.

11. A method of claim 10 wherein said monoalkyl phosphate is mono-(2-ethylhexyl)phosphate, said dialkyl phosphate is di-(2-ethylhexyl)phosphate, and said trialkyl phosphate is tributyl phosphate.

12. A method of claim 8 wherein said organic solvent comprises a long-chained hydrocarbon solvent.

13. A method of claim 12 wherein said long-chained hydrocarbon solvent comprises kerosene.

14. A method of claim 8, wherein said extraction solution additionally comprises a long-chained alcohol.

15. A method of claim 14 wherein said long-chained alcohol is 2-octanol.

16. A method of claim 8, wherein the pH during the extraction stage is adjusted by adding a neutralizing agent in order to at least partially compensate for the pH decrease caused by protons released from said organic phosphate.

17. A method of claim 1, wherein said waste water sludge comprises metal sludge obtained by subjecting waste water sludge from a waste water treatment plant to acid treatment followed by filtration to provide a filtrate, and subsequently precipitating metal sludge from the filtrate.

* * * * *